(12) United States Patent
Warwick et al.

(10) Patent No.: US 6,378,664 B1
(45) Date of Patent: Apr. 30, 2002

(54) CONSISTENT RETRACTION DEVICE FOR DISC BRAKE CALIPERS

(75) Inventors: Edward Harry Warwick, Englewood; David F. Nelson, Springfield, both of OH (US)

(73) Assignee: Delpi Technologies, Inc., Troy, MI (US)

( * ) Notice: Subject to any disclaimer, the term of this patent is extended or adjusted under 35 U.S.C. 154(b) by 0 days.

(21) Appl. No.: 09/514,731

(22) Filed: Feb. 28, 2000

(51) Int. Cl.7 .............................................. F16D 55/22
(52) U.S. Cl. ........................................ 188/72.3; 92/168
(58) Field of Search .............................. 188/72.3, 72.4, 188/72.5; 277/394, 434, 435, 457, 459; 92/165 R, 168

(56) References Cited

U.S. PATENT DOCUMENTS

| | | | |
|---|---|---|---|
| 4,325,471 A | * 4/1982 | Schuster | 188/72.3 |
| 4,386,682 A | * 6/1983 | Woo et al. | 188/71.8 |
| 4,387,901 A | * 6/1983 | Ritsema | 277/165 |
| 4,469,337 A | * 9/1984 | Yokoi et al. | 277/212 FB |
| 5,172,793 A | * 12/1992 | Temple et al. | 188/72.4 |
| 5,325,940 A | * 7/1994 | Rueckert et al. | 188/71.8 |
| 6,164,422 A | * 12/2000 | Sanitate et al. | 188/72.4 |

* cited by examiner

*Primary Examiner*—Pam Rodriguez
(74) *Attorney, Agent, or Firm*—Robert M. Sigler

(57) ABSTRACT

A retraction device for a disc brake caliper is provided having brake pads actuated by hydraulic fluid. The device includes a housing having a bore that defines an axis. A piston is disposed within the bore and is movable along the axis between applied and retracted positions. The piston includes an apply end adapted to coact with the brake pads in the applied position and a hydraulic end opposite the apply end. A hydraulic chamber is defined by the bore and the hydraulic end and contains hydraulic fluid for generating a brake pressure to achieve the applied position. An annular groove is formed in the bore adjacent to the piston, and the annular groove includes a forward angled surface. A resilient seal is disposed within the annular groove for retracting the piston from the applied position to the retracted position. The resilient seal has a first side adjacent the forward angled surface and a second side opposite the first side. A pressure mechanism is arranged adjacent to the second side and is in communication with the hydraulic chamber for generating a retaining pressure to retain the resilient seal against the forward angled surface in response to the brake pressure. The pressure mechanism releases the retaining pressure to permit the resilient seal to retract the piston when below the brake pressure.

15 Claims, 1 Drawing Sheet

CONSISTENT RETRACTION DEVICE FOR DISC BRAKE CALIPERS

TECHNICAL FIELD

This invention relates to hydraulically actuated disc brake calipers, and more specifically, the invention relates to a method and apparatus for consistently retracting a piston after the brakes have been released.

BACKGROUND OF THE INVENTION

Disc brake calipers are widely used in motor vehicles to slow the vehicle when the brakes are applied. The disc brake caliper includes a hydraulically actuated piston that coacts with spaced apart brake pads. A rotor, which supports a wheel is arranged between the brake pads. The piston is disposed within a bore in a housing. The piston and bore define a hydraulic chamber. One brake pad is coupled to the piston, and a housing flange opposite the piston supports the other brake pad. When a brake pedal is actuated, hydraulic fluid fills the hydraulic chamber and generates a brake pressure which forces the piston outward thereby squeezing the rotor with the brake pads.

After the brake pedal is released, the piston retracts so the rotor may rotate freely between the brake pads. A resilient seal is utilized between the piston and housing to retract the piston when the brake pressure is removed. The seal is received within an annular groove in the housing and has inner and outer diameters. The inner diameter of the seal engages the outer diameter of the piston and the outer diameter is retained within the annular groove. As the piston moves outward when the brake pedal is actuated, the inner diameter of the seal should move with the piston while the outer diameter of the seal remains stationary. When the brake pressure is removed, the seal should retract the piston.

However, with prior art disc brake calipers, the seal may fail to retract the piston, which permits the brake pads to drag on the rotor and reduce fuel economy. The brake pressure within the hydraulic chamber may reach 1000–1500 psi during hard brake applies, which causes the disc brake caliper to deflect permitting the piston to slide through the seal. Specifically, the piston moves relative to the inner diameter of the seal. As a result, the seal is unable to retract the piston for subsequent brake applies and the brake pads drag on the rotor after the brakes have been released. Therefore, what is needed is a consistent retraction device that retracts the piston and reduces brake pad drag on the rotor thereby increasing fuel economy.

SUMMARY OF THE INVENTION

The present invention provides a retraction device for a disc brake caliper having brake pads actuated by hydraulic fluid. The device includes a housing having a bore that defines an axis. A piston is disposed within the bore and is movable along the axis between applied and retracted positions. The piston includes an apply end adapted to coact with the brake pads in the applied position and a hydraulic end opposite the apply end. A hydraulic chamber is defined by the bore and the hydraulic end and contains hydraulic fluid for generating a brake pressure to achieve the applied position. An annular groove is formed in the bore adjacent to the piston, and the annular groove includes a forward angled surface. A resilient seal is disposed within the annular groove for retracting the piston from the applied position to the retracted position. The resilient seal has a first side adjacent the forward angled surface and a second side opposite the first side. A pressure mechanism is arranged adjacent to the second side and is in communication with the hydraulic chamber for generating a retaining pressure to retain the resilient seal against the forward angled surface in response to the brake pressure. The pressure mechanism releases the retaining pressure to permit the resilient seal to retract the piston when below the brake pressure.

The present invention also provides a method of retracting a piston within a disc brake caliper. The method includes the steps of applying brake pressure to the piston and applying a retaining pressure to retain a resilient seal that is in engagement with the piston against an angled surface. The method also includes the steps of removing the brake pressure from the piston and removing the retaining pressure to retract the piston with the resilient seal.

Accordingly, the present invention provides an apparatus and method of consistently retracting the piston and reducing brake pad drag on the rotor thereby increasing fuel economy.

BRIEF DESCRIPTION OF THE DRAWINGS

Other advantages of the present invention can be understood by reference to the following detailed description when considered in connection with the accompanying drawings wherein.

DESCRIPTION OF THE PREFERRED EMBODIMENT

Figure 1:
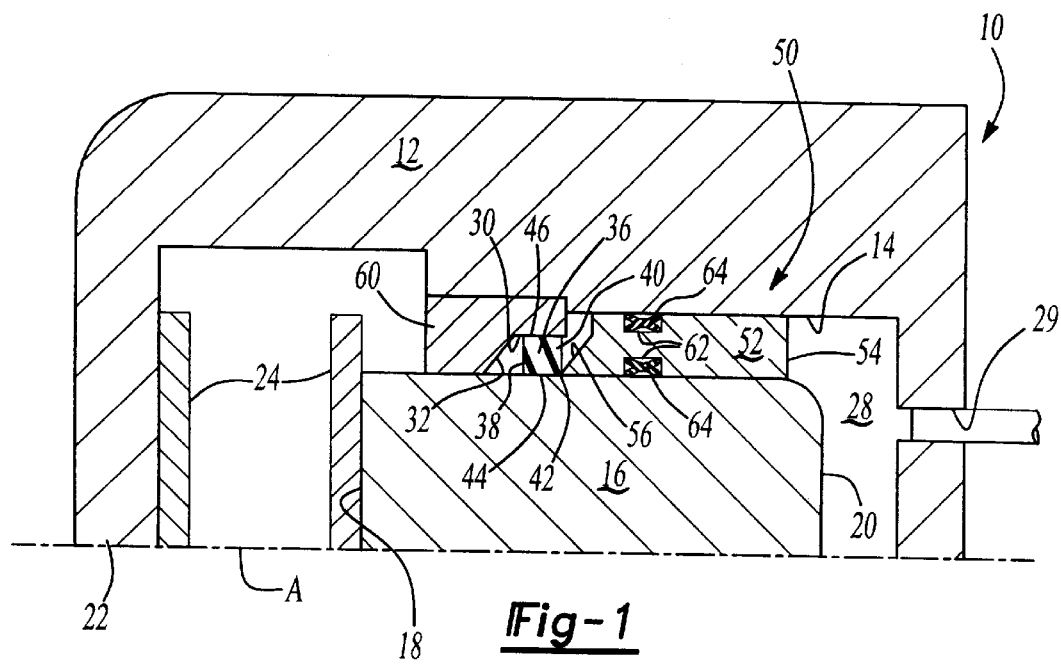
FIG. 1 is a cross-sectional view of a disc brake caliper having the present invention retraction device.
Figure 2:
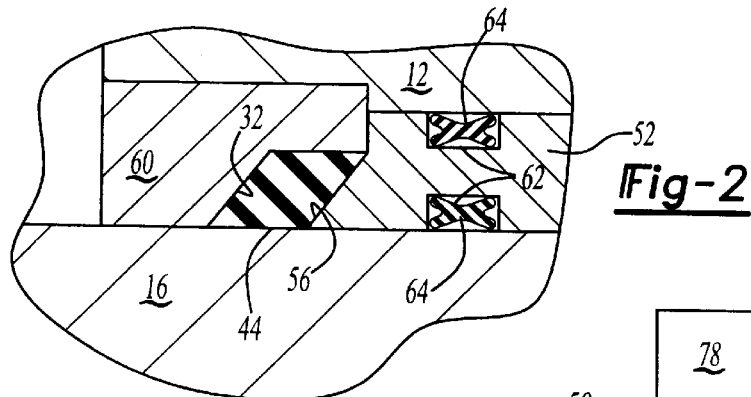
FIG. 2 is an enlarged view of the retraction device of FIG. 1 in an applied position.

A retraction device for a disc brake caliper 10 is shown in FIGS. 1 and 2. The disc brake caliper 10 has housing 12 with a bore 14 that defines an axis A. A piston 16 is disposed within the bore 14 and is movable along the axis A between applied (FIG. 2) and retracted (FIG. 1) positions. The piston 16 includes an apply end 18 and a hydraulic end 20 opposite the apply end 18. The disc brake caliper 10 includes a brake pad 24 supported by a flange 22 on the housing 12 opposite the piston 16. Another brake pad 24 is attached to the piston 16. A rotor (not shown) is supported between the brake pads 20 and has a wheel (not shown) supported thereon. The brake pads 24, or brakes, are actuated by hydraulic fluid as is well known in the art, which forces the brake pads 24 together thereby squeezing the rotor.

A hydraulic chamber 28, which is fed by a brake line 29, is defined by the bore 14 and the hydraulic end 20 and contains hydraulic fluid for generating a brake pressure to achieve the applied position. An annular groove 30 is preferably formed in the bore 14 adjacent to the piston 16 and includes a forward angled surface 32. A resilient seal 36 is disposed within the annular groove 30 for retracting the piston 16 from the applied position (FIG. 2) to the retracted position (FIG. 1), as will be better appreciated from the discussion below. The resilient seal 36 has a first side 38 adjacent the forward angled surface 32 and a second side 40 opposite the first side 38. The seal 36 further includes an inner diameter 42 that engages the outer diameter of the piston 16. The inner diameter 42 has a plurality of ribs 44, preferably cut by a lathe, that increase the friction between the seal 36 and the piston 16. Seal 36 also has an outer diameter 46 that is seated in the annular groove 30 and is permitted to move only a relatively small distance along axis A.

As discussed above, the piston 16 may slip through the seal when the housing 12 deflects under high brake pressures. The present invention ensures that the inner diameter 42 of the seal 36 stays in engagement with the piston 16 when the brakes are applied while the outer diameter 46 of the seal 36 remains seated in the annular groove 30 (see FIG. 2). Said another way, the inner diameter 42 of the seal moves along axis A with the piston 16 while the outer diameter 46 moves relatively little along axis A. This is achieved by a pressure mechanism 50 that is arranged adjacent the second side 40 of the seal 36 and is in communication with the hydraulic chamber 28 for generating a retaining pressure to retain the resilient seal 36 against the forward angled surface 32 in response to the brake pressure. The pressure mechanism 50 releases the retaining pressure to permit the resilient seal 36 to retract the piston 16 when below the brake pressure, or when the brakes are released.

In one embodiment of the invention shown in FIGS. 1 and 2, the pressure mechanism 50 comprises an annular intermediate piston 52 movable along the axis A and interposed between the housing 12 and the piston 16. The intermediate piston 52 has opposing hydraulic 54 and retaining 56 ends. The retaining end 56 is proximate to the resilient seal 36 and preferably has a complementary profile to the forward angled surface 32. The housing 12 includes a secondary portion 60 proximate to the apply end 18 of the piston 16 to form the annular groove 30 and permit installation of the intermediate piston 52 into the bore 14. The secondary portion 60 includes the forward angled surface 32. In operation, the brake pressure slides the intermediate piston 52 within the bore 14 thereby moving the retaining end 54 into engagement with the resilient seal 36 to retain the resilient seal 36 against the forward angled surface 32, as shown in FIG. 2.

The intermediate piston 52 includes a second annular groove 62 disposed between the annular groove 30 and the hydraulic chamber 28 adjacent each of the housing 12 and the piston 16. X-shaped lip seals 64 are disposed in the second annular grooves 62 to tightly seal the intermediate piston 52 and prevent hydraulic fluid from leaking past the lip seals 64. It is to be understood that seals of other configurations may be used.

Figure 3:
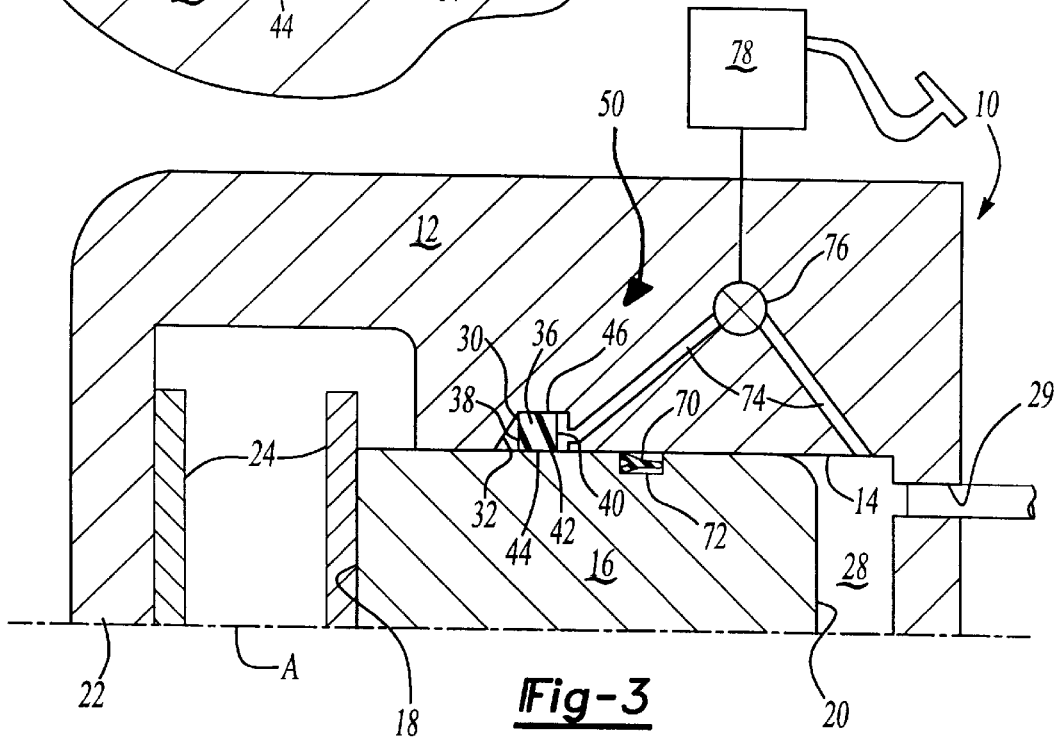
FIG. 3 is a cross-sectional view of an alternative embodiment of the present invention retraction device.

In a second embodiment shown in FIG. 3, the device 10 further has a lip seal 70 interposed between the piston 16 and the housing 12 and arranged between the annular groove 30 and the hydraulic chamber 28. The piston 16 includes a second annular groove 72 disposed between the apply 18 and the hydraulic 20 ends with the lip seal 70 being disposed in the second annular groove 72. The lip seal 70 of the second embodiment is a part of the pressure mechanism 50 in that it acts as a one-way valve permitting hydraulic fluid to flow only from the hydraulic chamber 28 to the annular groove 30. Unlike the lip seals 64 of the first embodiment, the lip seal 70 of the second embodiment is Y-shaped which permits the hydraulic fluid to bypass the lip seal 70 when under the brake pressure for generating the retaining pressure. It is to be understood that other seal configurations may be used.

The pressure mechanism 50 also includes a fluid passageway 74 fluidly connecting the hydraulic chamber 28 and the annular groove 30 for relieving the retaining pressure by permitting hydraulic fluid to flow from the second side 40 of the resilient seal 36 through the fluid passageway 74 to the hydraulic chamber 28 when below the brake pressure, or when the brakes are released. To this end, the pressure mechanism 50 further includes a valve 76 disposed in the fluid passageway 74 between the annular groove 30 and the hydraulic chamber 28. The valve 76 has open and closed positions with the valve 76 being in the closed position when the device 10 is in the applied position. A brake pedal 78 is connected to the valve 76 to actuate the valve between the open and closed position. The brake pedal 78 has brake and release positions with the valve 76 being in the closed position when the brake pedal 78 is in the brake position, or depressed. Conversely, the valve 76 is in the open position when the brake pedal 78 in the release position.

In operation, brake pressure is applied to the piston 16 to move the piston 16 along axis A and actuate the brakes. A retaining pressure is applied to the resilient seal 36 to retain it against the forward angled surface 32. In the first embodiment, the intermediate piston 52 slides within the bore 14 and engages the seal 36. In the second embodiment, hydraulic fluid leaks past the lip seal 70 to hold the seal 36 against the forward angled surface 32 while the valve 76 is in the closed position.

When the brake pedal 78 is released, the brake pressure is removed from the piston 16. As the brake pressure is removed, the retaining pressure is removed to retract the piston 16 with the retracting device, or resilient seal 36. In the first embodiment, the pressure at the hydraulic end 54 of the intermediate piston 52 drops which permits the seals 36 to pull or retract the piston 16 to the retracted position. In the second embodiment, as the brake pedal 78 is released, the valve 76 opens which drops the pressure on the second side 40 of the seal 36 and permits the seal 36 to pull the piston 36 to the retracted position.

What is claimed is:

1. A retraction device for a disc brake caliper having brake pads actuated by hydraulic fluid, said device comprising:
    a housing having a bore defining an axis;
    a piston disposed in said bore and movable along said axis between applied and retracted positions, said piston having an apply end adapted to coact with the brake pads in said applied position and a hydraulic end opposite said apply end;
    a hydraulic chamber defined by said bore and said hydraulic end, said hydraulic chamber containing hydraulic fluid for generating a brake pressure to achieve said applied position;
    an annular groove in said bore adjacent to said piston having a forward angled surface;
    a resilient seal disposed within said annular groove for retracting said piston from said applied position to said retracted position, said resilient seal having a first side adjacent said forward angled surface and a second side opposite said first side; and
    a pressure mechanism adjacent to said second side and in communication with said hydraulic chamber for generating a retaining pressure to retain said resilient seal against said forward angled surface in response to said brake pressure, and said pressure mechanism releasing said retaining pressure to permit said resilient seal to retract said piston when below said brake pressure.

2. The device according to claim 1, wherein said pressure mechanism comprises a lip seal interposed between said piston and said housing and arranged between said annular groove and said hydraulic chamber, the hydraulic fluid bypassing said lip seal when under said brake pressure for generating said retaining pressure.

3. The device according to claim 2, wherein said lip seal is a one way valve permitting hydraulic fluid to flow substantially only from said hydraulic chamber to said annular groove.

4. The device according to claim 3, wherein said piston includes a second annular groove disposed between said apply and said hydraulic ends, said lip seal being disposed in said second annular groove.

5. The device according to claim 2, wherein said pressure mechanism comprises a fluid passageway fluidly connecting said hydraulic chamber and said annular groove for relieving said retaining pressure by permitting hydraulic fluid to flow from said second side of said resilient seal through said fluid passageway to said hydraulic chamber below said brake pressure.

6. The device according to claim 5, wherein said pressure mechanism further includes a valve disposed in said fluid passageway between said annular groove and said hydraulic chamber, said valve having open and closed positions with said valve being in said closed position in said applied position.

7. The device according to claim 6, wherein said device further comprises a brake pedal having brake and release positions, said valve being in said closed position in said brake position and in said open position in said release position.

8. The device according to claim 1, wherein said pressure mechanism comprises an intermediate piston movable along said axis and interposed between said housing and said piston, said intermediate piston having opposing hydraulic and retaining ends, said retaining end proximate to said resilient seal, said brake pressure moving said retaining end into engagement with said resilient seal to retain said resilient seal against said forward angled surface.

9. The device according to claim 8, wherein said device further comprises a first lip seal interposed between said intermediate piston and said housing and arranged between said annular groove and said hydraulic chamber, and a second lip seal interposed between said intermediate piston and said piston and arranged between said annular groove and said hydraulic chamber.

10. The device according to claim 9, wherein said intermediate piston includes a second annular groove disposed between said apply and said hydraulic ends adjacent to each of said housing and said piston, said first and said second lip seals being disposed in said second annular groove.

11. The device according to claim 8, wherein said retaining end has a complementary profile to said forward angled surface.

12. The device according to claim 8, wherein said housing includes a secondary portion proximate to said apply end of said piston, said secondary portion including said forward angled surface.

13. The device according to claim 1, wherein said resilient seal has an inner diameter in engagement with said piston, said inner diameter having a plurality of ribs for increasing friction between said piston and said resilient seal.

14. A method of retracting a piston of a disc brake caliper, the method comprising the steps of:
   a) applying a brake pressure to the piston;
   b) applying a retaining pressure to retain a resilient seal that is in engagement with e piston against an angled surface;
   c) removing the brake pressure from the piston; and
   d) removing the retaining pressure to retract the piston with the resilient seal,
   wherein step b) includes applying hydraulic fluid to the resilient seal and step d) includes draining hydraulic fluid away from the resilient seal through a fluid passageway.

15. A method of retracting a piston of a disc brake caliper, the method comprising the steps of:
   a) applying a brake pressure to the piston;
   b) applying a retaining pressure to retain a resilient seal that is in engagement with the piston against an angled surface;
   c) removing the brake pressure from the piston; and
   d) removing the retaining pressure to retract the piston with the resilient seal,
   wherein step b) includes moving an intermediate piston into engagement with the resilient seal and step d) includes moving the intermediate piston out of engagement with the resilient seal.

* * * * *